Nov. 15, 1966   M. A. MENICKELLA ETAL   3,286,067
CONTACT PRESSURE ARRANGEMENT FOR CIRCUIT BREAKER MECHANISM
Original Filed June 6, 1963                     3 Sheets-Sheet 1
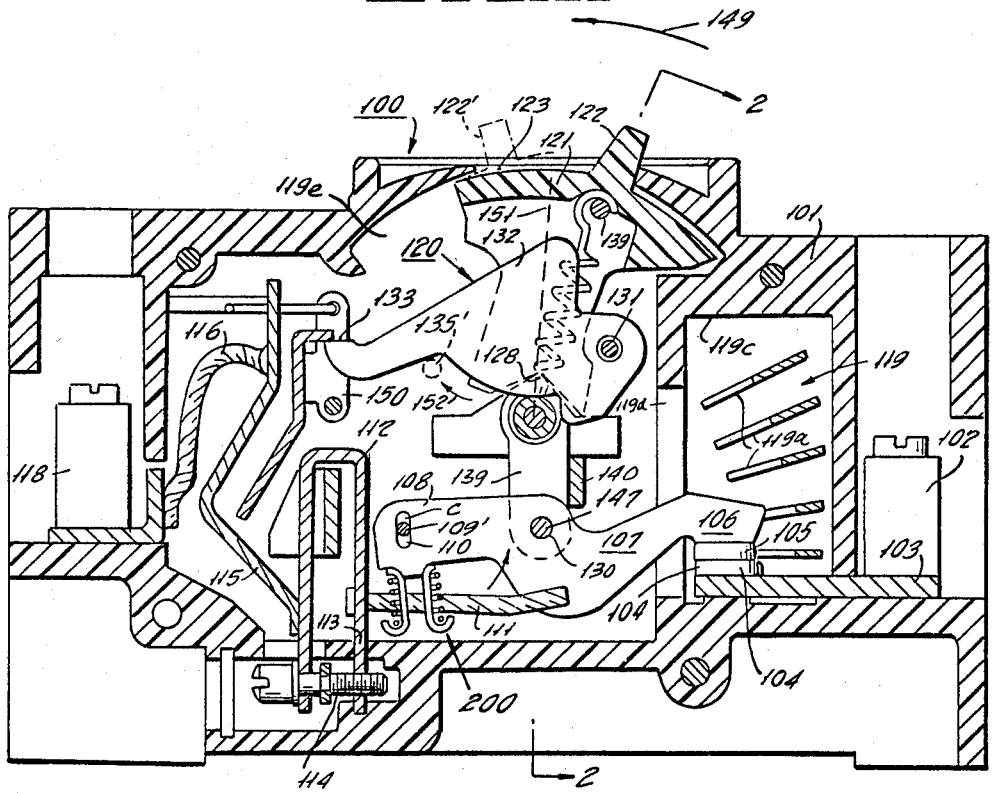
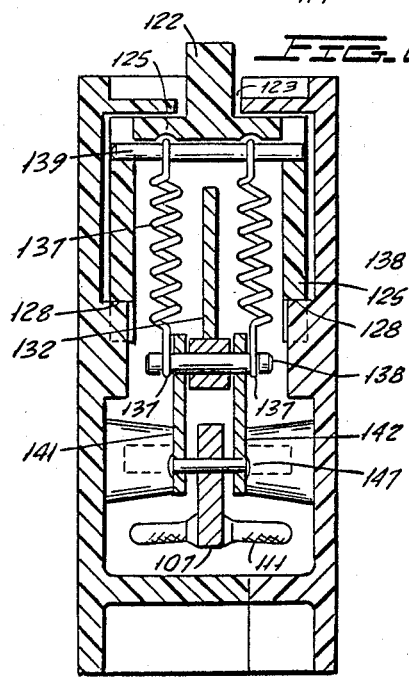
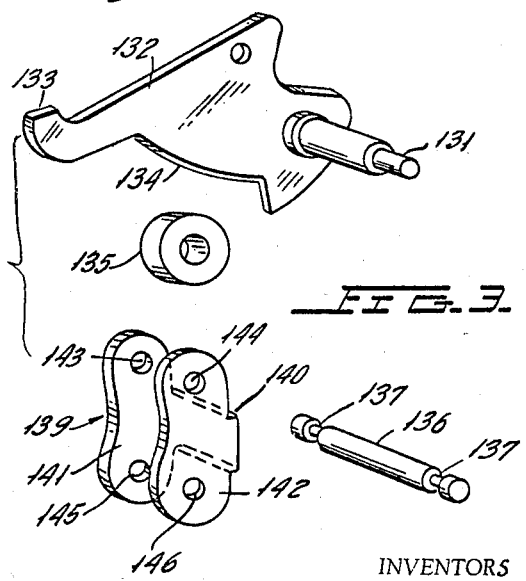
INVENTORS
MARTIN V. ZUBATY
BY MICHAEL A. MENICKELLA
OSTROLENK, FABER, GERB & SOFFEN
ATTORNEYS

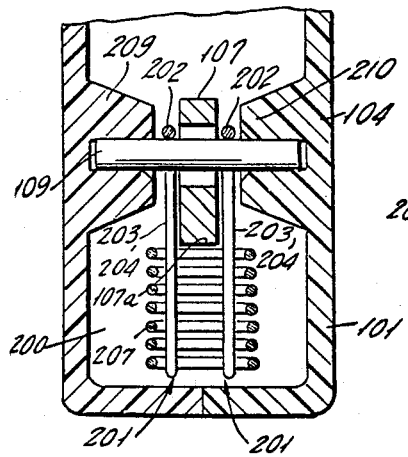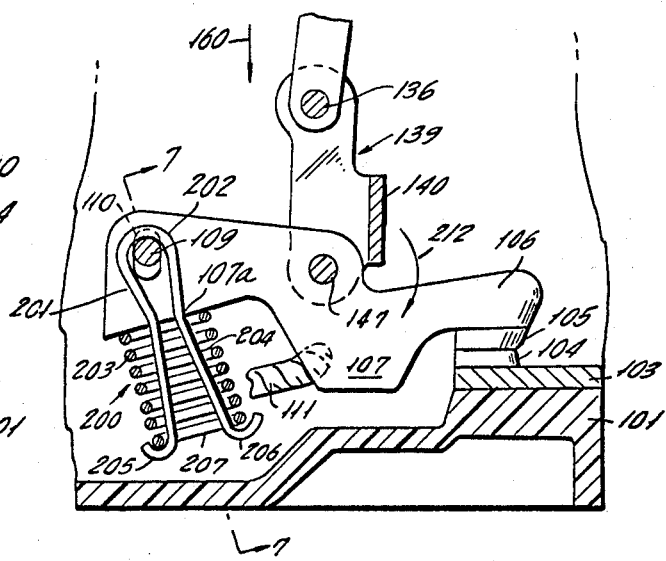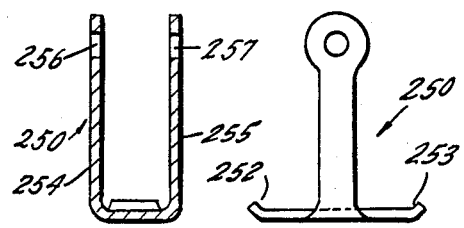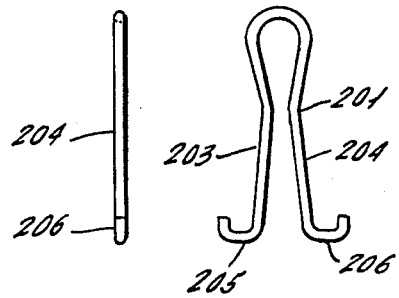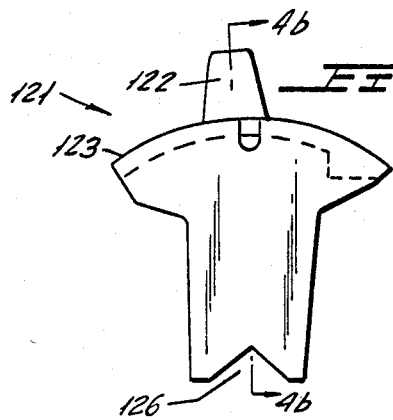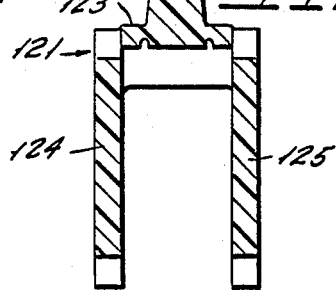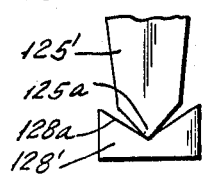

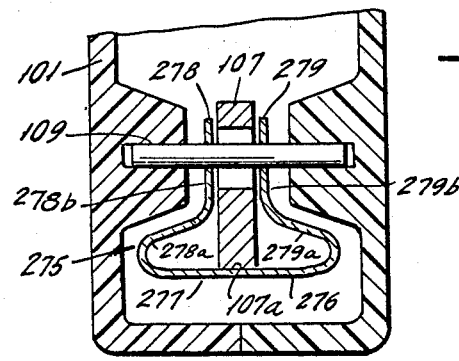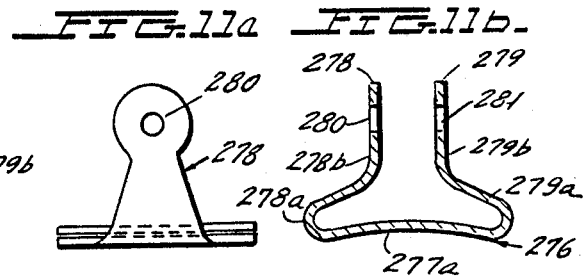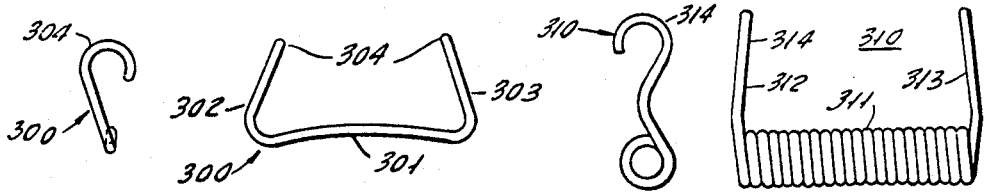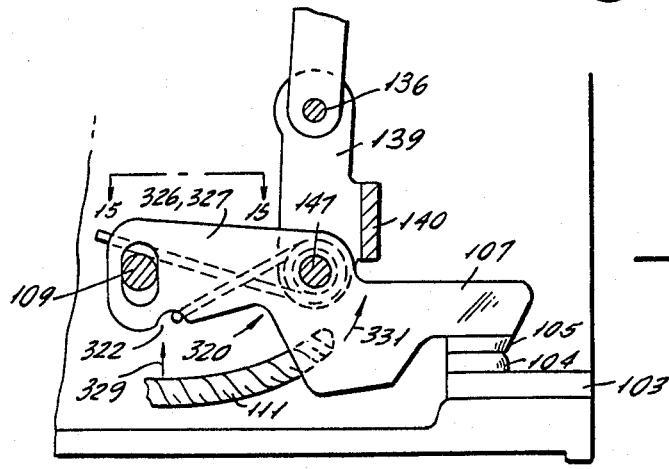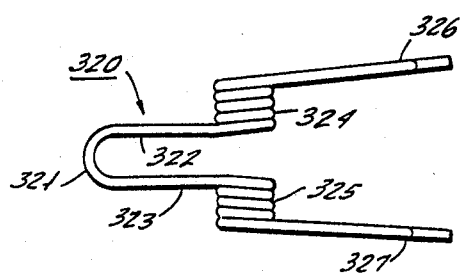

United States Patent Office 3,286,067
Patented Nov. 15, 1966

3,286,067
CONTACT PRESSURE ARRANGEMENT FOR
CIRCUIT BREAKER MECHANISM
Michael A. Menickella, Philadelphia, Pa., and Martin V.
Zubaty, Warren, Mich., assignors to I-T-E Circuit
Breaker Company, Philadelphia, Pa., a corporation of
Pennsylvania
Original application June 6, 1963, Ser. No. 285,970.
Divided and this application Oct. 4, 1965, Ser. No.
492,414
10 Claims. (Cl. 200—153)

This invention relates to circuit interrupters, and more particularly to circuit interrupters having a novel pressure producing means in conjunction with a quick make-break overcenter mechanism, and is a divisional of U.S. patent application Serial No. 285,970, filed June 6, 1963.

Present day circuit interrupters are normally provided with manually operating mechanism capable of performing quick-make, quick break operations upon the circuit breaker cooperating contacts in order to either eliminate or minimize arcing during the performance of these operations. In either the quick-break or the quick-make operations, it is extremely important that these operations be carried out with extreme reliability since failure of the mechanical operating means to perform these duties reliably may result in substantial damage and/or destruction to the loads protected by such circuit interrupters.

It is therefore one major function to provide such manual operating mechanism which have the extremely high reliability and extremely long useful operating lives. To achieve this objective is the development of a design for such operating means which minimizes the number of elements and/or moving parts employed in the manual operating mechanism while at the same time providing a reliable long operating life device which performs all of the functions of prior existing devices which may require many more elements for performing such functions.

One typical prior art manual operating mechanism is fully described in U.S. Patent No. 2,932,706 entitled, "Hold-Open and Anti-Rebound Latches," issued April 12, 1960 to A. Bodenschatz and assigned to the assignee of the instant invention. While a description of the manual operating device contained therein will be omitted from the instant specification for reasons of clarity, a consideration of the above mentioned U.S. patent application fully sets forth the number of components necessary to provide a reliable manual operating mechanism.

The device of the instant invention performs all of the functions of prior art devices, such as, for example, the prior art device covered in the above mentioned U.S. patent application while at the same time having a novel design which enables the manual operating mechanism to be comprised of substantially fewer elements than such prior art devices.

The instant device is comprised of a manual operating mechanism having upper and lower toggle means wherein the upper toggle means is comprised of a latched cradle means having a cam surface. Lower toggle means is pivotally connected to a contact blade bearing a cooperating contact and having its opposite end pivotally secured to a stationary means. The opposite end of the toggle means rollingly engaged the cam surface by suitable roller means which is formed of a low friction material. An overcenter operating spring is assembled with one end secured to the manual operating handle means and the other end secured to a roller pin means included within the roller means. By operating the handle to predetermined positions the force line of the spring means is changed forcing the lower toggle together with the engaged roller means to move along the cam surface. This movement of the lower toggle produces a turning moment about the contact blade pivot point forcing the contact blade to rotate with its cooperating contact either being forced into or urged out of engagement with the stationary cooperating contact which is affixedly mounted in any suitable means.

The instant invention is directed to a novel contact pressure producing means which counteracts any contact separation movement by providing a force to act against the counterclockwise rotation of the contact blade about the point at which it is pivotally connected with the lower toggle means. Such rotation is permitted by a lost motion arrangement provided at the pivot points of the contact blade, thereby permitting a spring means contained within the contact pressure producing means to be suitably compressed. The contact pressure spring is mounted between spring retaining means and the slotted end of the contact blade. The spring retainer is held and rotated on the contact blade rotation pin bearing and guides the contact blade. All parts make a complete mounting unit.

The contact pressure is produced by the counterclockwise rotation of the contact blade about the pivotal means, mounting the contact blade to the lower toggle means. This motion causes the contact blade to compress the spring means against the spring retainer which is firmly held by being looped about the rotation pin. The spring and spring retainer rotate with the contact blade. The elongated slot permits this motion to occur and as a result wiping action of the contact occurs. The sliding and wiping action on the contact is a function of the slot formed in the contact blade. Thus, the manual operating mechanism, together with the contact pressure producing means, cooperate to provide a novel quick-make, quick-break operating mechanism having superior contact pressure and wiping capabilities, while at the same time providing a device having substantially fewer components than such prior art devices employed for providing the same or similar functions.

It is therefore one object of the instant invention to provide manual operating means for circuit interrupters having novel contact pressure producing means for providing superior contact pressure and contact wiping capabilities.

Another object of the instant invention is to provide novel manual operating means comprising contact pressure producing means which are so mounted relative to the circuit interrupter cooperating contacts as to be well removed from the current path extending through the circuit interrupter so as to be free from any undue heating thereof.

These and other objects of the instant invention will become apparent when reading the accompanying description and drawings in which:

FIGURE 1 is a sectional elevational view of a circuit breaker designed in accordance with the principles of the instant invention.

FIGURE 2 is a view of the circuit breaker of FIGURE 1 taken along the lines 2—2'.

FIGURE 3 is an exploded view of the upper and lower toggle means and roller means to the manual operation means shown in FIGURES 1 and 2.

FIGURE 4a is a side view of the manual operating handle of FIGURES 1 and 2.

FIGURE 4b is a sectional view of the manual operating handle shown in FIGURE 4a taken along the lines 4b and 4b'.

FIGURE 5 is an alternative arrangement for the handle means of FIGURES 1–4b.

FIGURE 6 shows the contact pressure producing means of FIGURE 1 in greater detail.

FIGURE 7 is a sectionalized view of the contact pressure producing means of FIGURE 6 taken along the lines 7—7'.

FIGURES 8a and 8b are side and end views respectively, of the retaining means of FIGURES 6 and 7.

FIGURES 9a and 9b are side and end views respectively, of an alternative embodiment for the retainer pin of FIGURES 8a and 8b.

FIGURE 10 is a cross-sectional view of a circuit breaker substantially similar to that of FIGURE 7 showing an alternative embodiment for the contact pressure producing means of FIGURE 7.

FIGURES 11a and 11b are side and end views of the contact pressure producing means of FIGURE 10.

FIGURES 12 and 12b are side and end views respectively, of an alternative embodiment for the contact pressure producing means of FIGURES 11a and 11b.

FIGURES 13a and 13b are side and end views respectively, of another alternative embodiment for the contact pressure producing means of FIGURE 10.

FIGURE 14 shows a portion of the circuit breaker of FIGURE 1 employing still another alternative embodiment for the contact pressure producing means of FIGURES 6–13.

FIGURE 15 shows a top view of the contact pressure producing means of FIGURE 14 looking in the direction of lines 15—15'.

Referring now to the figures, and particularly to FIGURE 1, there is shown therein a circuit breaker 100 which is illustrated as being a three-phase device the three phases of which are electrically isolated from one another by suitable insulating barriers and are mechanically tied together by a common insulating bar 130 in a common tripper means 150 which devices are to be more fully described. The manual operating mechanism 120 is immediately connected to the center phase and by means of the insulating bar 130 and the tripping means 150 the operation of the remaining two phases are co-ordinated with the operation of the central phase so that all three phases are operated simultaneously to the on and off positions. While the embodiment of FIGURE 1 may be described as being a three-phase device, it should be understood that the manual operating mechanism 120 of the instant invention may be used in any circuit breakers having a greater or lesser number of phases than the number of phases employed, lends no novelty to the device of the instant invention.

Each of the phases includes an identical interruptible current path through the circuit breaker 100. For the sake of brevity, only one current path will be described, it being understood that the current path of the other two phases are identical to the current path of the described phase. This current path comprises a source terminal 102 and a bus conductor 103 to stationary contact 104. Stationary contact 104 is engageable by movable contact 105 which is mounted on the rigid forward section 106 of contact arm or blade 107. Contact blade 107 is rigid through is entire length and terminates at an end portion 108 thereof which is connected by means of a pin 109 slidably engaged within elongated slot 110 to pivotally engage the contact blade 107 to the circuit breaker insulated housing 101 in any suitable fashion. An intermediate portion connected to the intermediate portion of contact blade 107 is a pigtail 111 the opposite end of which is suitably connected to a U-shaped conductive member 112 suitably secured to the housing 101 by means of the slot 113 and fastening member 114. The U-shaped conductive member 112 is connected near its opposite end to a bimetal member 115 which has connected near its opposite end a second pigtail member 116 the other end of which is connected to rigid conductor 117 upon which a load terminal 118 is rigidly secured. By operating the contact blade 107 between its open and close positions the aforementioned current path through circuit breaker 100 will be selectively opened and closed as the case may be.

The circuit breaker molded case housing 101 is provided with a suitable cavity 119c which houses an arc chute arrangement 119 comprised of a plurality of arc plates 119a positioned and secured within the cavity 119c and designed to provide a tortuous path for any arc contained therein. During the opening operation when movable contact 105 disengages itself from stationary contact 104 the contact blade 107 is free to move due to the opening 119d in the cavity 119c.

Housing 101 is provided with a second suitable cavity 119e designed to house the manual operating mechanism 120 or the circuit breaker 100. The manual operating mechanism 120 is comprised of an operating handle 121 having a projection 122 extending through a suitable opening 123 in housing 101. Projection 122 may be finger-gripped so as to move the manual handle 121 clockwise or counterclockwise about its pivot point. Handle 121 has an upper arcuate portion 123 which is substantially wide enough (see FIGURES 4a, 4b and 2) so as to effectively seal off opening 123 from the cavity 119e. As can be seen in FIGURES 2 and 4b manual handle 122 is substantially U-shaped and is provided with first and second arms 124 and 125 each of which is provided with a suitable notch such as, for example, the notch 126 at its lower end. These notches cooperate with the V-shaped projections 128 provided within the housing 101 to position and support handle member 121 and further throughout as the pivot point about which handle 121 rotates. Positioned between the arms 124 and 125 of handle member 122 is a cradle motor 132 which is pivoted near its right-hand end by a pivot means 131 suitably secured to housing 101 in any well known fashion. The opposite end of cradle member 132 is provided with a shoulder 133 which cooperates with the tripping means 150 to provide an automatic tripping operation of the circuit breaker 100 in the manner to be more fully described.

The underside of cradle member 132 is provided with a cam surface 134 which is positioned to make rolling engagement with a roller member 135 which roller member engages the cam surface 134 around its circular periphery and is pivoted to rotate about the roller pin member 136. The roller pin 136 is provided with suitable collars 137 for receiving the first ends of first and second spring members 137 and 138, the second ends of which are suitably secured to a fastening bar 139 which is rigidly mounted in the upper end of operating handle 131. FIGURE 3 shows an exploded view of the cradle member 132, roller 135 and roller pin 136.

A lower toggle member 139 is provided having a central portion 140 and two extending arms 141 and 142. Both of said arms 141 and 142 are provided with upper and lower apertures 143–144 and 145–146 respectively, wherein upper apertures 143–144 are designed to have the roller pin 136 threaded therethrough as can best be seen in FIGURE 2. The lower apertures 145 and 146 are designed to receive the pin 147 which pivotally engages lower toggle means 139 to contact blade 107 as can best be seen in FIGURES 1 and 2. The pivotal connection between contact blade 107 and lower toggle means 139 provides the driving force for rotating the contact blade 107 whereas the pivotal connection provided by pin 109 and elongated slot 110 provides the position about which the contact blade 107 effectively pivots.

The operation of the manual operating mechanism 120 is as follows:

In the position shown in FIGURE 1, spring members 137 and 138 are under substantial tension causing roller pin 136 to be urged upwardly in the direction towards the upper fastening bar 139. So long as the operating handle 121 is in the position shown in FIGURE 1 the operating springs 137 and 138 will remain in this position indefinitely. This position causes the contact blade 107 to have its movable cooperating contact 105 in engagement with the stationary cooperating contact 104 to thus provide a closed current path between source and load terminals 102 and 118. However, when the operating handle 121 is moved counterclockwise in the direction shown by arrow 149, this causes upper fastening bar 139 to likewise move in the same direction until the fastening bar 139 moves beyond the overcenter position shown by phantom line 151. As soon as it moves beyond this overcenter position this causes the line of action of the spring force to change thereby urging the roller member 135 along the cam surface 134 in the direction shown by arrow 152. This likewise causes the upper end of the lower toggle means 139 to move along the cam surface thereby causing the contact blade 107 to rotate counterclockwise about its pivot pin 109 in the direction shown by arrow 153. This thereby moves the movable contact 105 out of engagement with its cooperating stationary contact 104. Once the upper fastening bar 139 moves to the left of the dead-center position 151 the spring members 137 and 138 automatically take over the opening operation so as to very rapidly move both the roller 135 and the lower toggle means 139 in the direction shown by arrow 152 so as to provide the desirable quick-break operation.

With the projection 122 of the operating handle 121 at its extreme left-hand position, as shown in dotted fashion by the numeral 122′, the roller member is in the position shown by the dotted arrangement designated with the numeral 135′. The operation for closing the cooperating contacts 105 and 104 is substantially identical in that the operating handle is rotated in the counterclockwise direction until the upper fastening bar 139 passes beyond the upper dead-center position at which time the operating springs 137 and 138 immediately take over rapidly moving both the roller member 135 and the lower toggle means 139 to the solid line position shown in FIGURE 1 to provide a quick-make (i.e. rapid closing) operation.

With the arrangement shown in FIGURES 1–4b it can clearly be seen that no fastening means may be provided for the positioning of securement of the manual operating handle 121 since the spring members 137 and 138 provide this function while the housing 101 provides the necessary pivotal function by means of the V-shaped projections provided within the housing 101 which cooperate with the substantially V-shaped notches 126 provided in the arms 124 and 125 of handle member 121. As shown in FIGURE 5 an alternative embodiment to the arrangement of FIGURES 1–4b is such that the arms 124 and 125 are provided with substantially V-shaped marginal ends, such as, for example, the V-shaped end 125a provided at the end of arm 125′. These V-shaped ends of arms 124 and 125 are provided to cooperate with V-shaped notches such as the notch 128a provided in projection 128′. Either of the two embodiments serve their purposes equally well.

It can therefore be seen that circuit breaker 100 provides a novel manual operating mechanism for performing both quick-make and quick-break operations while at the same time being designed so as to have substantially fewer elements than such prior art devices. For example, in comparison to prior art opertaing means such as set forth by the aforementioned U.S. Patent 2,932,706, it can be seen that the instant invention eliminates the mechanism housing, one toggle lever with the pin, a handle arm and a contact bridge arm, which elements are employed in the operating mechanism taught by the aforementioned U.S. patent.

In addition to the quick-break, quick-make operating mechanism described above, the operating mechanism further provides novel contact pressure producing means 200 which is the subject of the instant application, the details thereof, while shown in FIGURE 1, can best be seen in greater detail in FIGURES 6 and 7. The contact pressure producing means 200 is comprised of a spring retainer means 201 which is substantially U-shaped in profile and has an upper central portion 202 curved about a pivot pin 109 journalled to rotate in bearings 209 and 210 provided in housing 101.

The central portion 202 has two downwardly extending arms 203 and 204 each of which are turned up at their extreme ends to form the hooked-shaped portions 205 and 206. A helical spring 207 is wound around the first and second retainer springs 201 (see FIGURE 7) so that the lower end of the spring (the last turn) is captured by the curved portions 205 and 206 and further so that the upper end of spring 207 abuts against the shoulder 107a of contact blade 107. In the positions shown in FIGURES 6 and 7, spring 207 is under compression and being captured at its lower end by retainer members 201 urges upward against the shoulder 107a of contact blade 107 causing it to pivot about pivot pin 147 in the clockwise direction as shown by arrow 212 to provide a substantial contact pressure between the cooperating contacts 105 and 104. This rotational movement is permitted due to the lost motion fashion arrangement of the elongated slot 110 and pin 109 which is threaded therethrough.

The operation of the contact pressure producing means is as follows:

Upon the occurrence of a closing operation, lower toggle means 139 moves in a downward direction as shown by arrow 160 of FIGURE 6 causing contact blade 107 to rotate in the clockwise direction as shown by arrow 212 about its pivot pin 109. When the contact 105 makes engagement with stationary contact 104 this causes a counterclockwise movement about pivot pin 147 causing the shoulder 107a to move downward against spring means 207 to compress it. Spring means 207 counteracts this compressor force urging contact blade upward moving it in the clockwise direction as shown by arrow 212 so as to provide a wiping action of movable contact 105 against stationary cooperating contact 104. In a substantially similar manner, the contact pressure producing means 200 with the spring 207 being under constant compression continuously provides a force in the clockwise direction as shown by arrow 212 acting to firmly hold movable contact 105 against its cooperating stationary contact 104.

FIGURES 8a and 8b show side and end views of the retainer means 201 of FIGURES 6 and 7 respectively, where like elements carry like numeral designations. FIGURES 9a and 9b show an alternative embodiment of the first and second retainer members 201 of FIGURES 8a and 8b. The retainer 250 of FIGURES 9a and 9b is comprised of a central portion 251 having slightly upturned ends 252 and 253. Extending upward in a substantially perpendicular direction from central portion 251 are a pair of arms 254 and 255, each being provided with a suitable aperture 256 and 257 respectively, for receiving the pin 109 shown in FIGURE 7. The helical spring 207, shown in FIGURES 6 and 7 is mounted so that its lower end rests upon the central portion 251 and is captured by the upturned flanges 252 and 253 while its upper portion is free to bear against the shoulder 107a of contact blade 107, in the same manner as previously described, with respect to FIGURES 6 and 7.

FIGURES 10, 11a and 11b show an alternative embodiment to those of FIGURES 6–9 wherein the contact pressure producing means 275 of FIGURES 10, 11a and 11b is comprised of a unitary member. The unitary member 276 is a substantially U-shaped member having a central portion 277 and first and second arms 278 and 279 which extend first inwardly (at 278a and 279a) and then upwardly (at 278b and 279b) in the manner as shown in FIGURES 10 and 11b. Each of the arms 278 and 279 are provided with suitable apertures 280 and 281 respectively, for receiving the pin 109 which pivotally mounts the contact blade 107.

The contact pressure producing means 276 has its central portion 277 curved upwardly at the position 277a intermediate its ends so that before mounting into the circuit breaker housing 101 contact pressure producing structure 276 appears in the manner shown in FIGURE 11b. When mounted into the circuit breaker housing 101 in the fashion shown in FIGURE 10, the shoulder 107a of contact blade 107 operates to "push out" the concave shape of the lower central portion 277 so that when appropriately mounted it has the configuration as shown in FIGURE 10. This central portion 277 has sufficient resiliency so as to act in the same manner as spring member 207 of FIGURES 6 and 7 in order to constantly urge upwardly against the shoulder 107a of contact blade 107 in order to maintain suitable contact pressure between the cooperating contacts 105 and 104 as well as providing suitable wiping action during the quick-make operation of the manual operating means.

FIGURES 12a and 12b show an alternative embodiment to that shown in FIGURES 11a and 11b wherein the contact pressure producing means, while being comprised of only one single element, is formed of a wire having a suitable resiliency and a substantially circular cross-section which is then bent in the manner shown in FIGURES 12a and 12b so as to form a substantially arcuate central portion 301 having upwardly and inwardly extending arms 302 and 303 each of which are provided with upper hooked portions 304 for hooking about the pivot pin 103, as shown in FIGURES 7 and 10. The central portion 301 of the contact pressure producing means 300 bears against the shoulder 107a of contact blade 107 in substantially the same manner as the contact pressure producing means 276 of FIGURES 11a and 11b to constantly maintain the cooperating contacts 104 and 105 into suitable firm engagement. Again, it should be noted that the material employed to form the contact pressure producing means 300 of FIGURES 12a and 12b must be of sufficient resiliency to provide the necessary contact pressure producing function.

FIGURES 13a and 13b show an alternative embodiment to the contact pressure producing means 276 and 300 of FIGURES 11a–12b, which contact pressure producing means 310 is comprised of a central portion 311 which is an extremely closely wound helical spring arrangement having first and second arms 312 and 313 extending from opposite ends thereof. Each of said arms are provided with upper hooked shaped portions 314 for hooking about the pivot pin 109. The helical spring central section 311 operates in the same manner as the central portions 277a and 301 of the contact pressure producing means 276 and 300 respectively, to provide the necessary contact pressure. Any of the above alternate embodiments have been found to operate with equal success.

FIGURES 14 and 15 show still another alternative embodiment which employs a torsional spring arrangement 320 which is employed for the purpose of providing suitable contact pressure. As can be seen in FIGURE 15, the torsional spring 320 is provided with a central portion 321 having extending arms 322 and 323 which at the ends thereof form the helical spring portions 324 and 325 respectively. The opposite ends of these helical spring portions extend to form the second arms 326 and 327 respectively. The central portion 321 of the torsional spring means 320 is positioned so that it rests within the notch 322 provided in the contact blade 107 and further, so that it bears upwardly against the contact blade 107 in the direction shown by arrow 329. The helical spring portions 324 and 325 are so positioned so that the pin 147 is threaded through both of these helical spring portions and the arms 326 and 327 are bent in such a manner that they bear downwardly against the upper surface of pivot pin 109. In this manner, with the contact blade 107 in the position as shown in FIGURE 14, the downward moving force of lower toggle member 139, together with the stationary contact 104 bearing upwardly against the movable contact 105 causes the contact blade 107 to be urged in the counter-clockwise direction about pivot pin 147 as shown by the arrow 331. This causes the contact blade to be urged downwardly against the central portion 321 of torsional spring member 320 at the notch 322. This places the torsional spring member 320 under a bending force and since arms 322 and 323 have a natural tendency to be urged towards the direction of arms 326 and 327 this causes central portion 321 to act upwardly against the notch 322 and contact blade 107 to maintain the suitable contact pressure as well as the wiping action as was previously described.

A significant feature which exists in all of the preferred embodiments of FIGURES 6–15 consists of the fact that the current path extends through conductive element 103, stationary contact 104, movable contact 105 and contact blade 107 to pigtail 111. Note, therefore, that none of the contact pressure producing means (200, 250, 276, 300, 310 or 320) lie within the current path of the circuit breaker. Thus, the contact pressure producing means do not carry any current whatsoever. The fact that they carry no current prevents them from being heated by means of such current, thereby substantially prolonging their useful operating lives. In addition thereto, it can be noted that all of the contact pressure producing means described in FIGURES 6–15 are positioned at or near the extreme left-hand end of the contact blade 107, whereas the cooperating contacts 104 and 105 are positioned at the opposite ends of contact blade 107, as well as the arc chute assembly 119, good distance away from the area in which arcing normally occurs during make and break operations so that the contact pressure producing structure will not be heated by means of the heat developed during the occurrence of such arcing phenomenon. Since heating of this nature weakens the spring elements or contact producing retaining members and causes their breakage after relatively short periods, the arrangement and positioning of the contact pressure producing means of the instant invention, in addition to providing superior contact pressure and contact wiping functions, is further capable of extremely long, useful operating life, substantially longer than those of prior art devices.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Operating means for use in a molded case circuit breaker having a first stationary contact and a pivotally mounted contact blade having a contact mounted thereon cooperating with said stationary contact wherein said operating means comprises an overcenter toggle linkage connected to the contact blade to effect rapid movement thereof into and out of engagement with said stationary contact, said toggle linkage including a first toggle means having an arcuate cam surface along one edge thereof; second toggle means having a first end pivotally connected to said contact blade at a point intermediate the ends thereof; and having a second end rollingly engaging said cam surface; an operating handle having a first end pivotally mounted in said housing and a second end movable along an arcuate path between a closed and an open position; spring means having a first end connected to the second end of said second toggle means and a second end connected to the second end of said operating handle for urging the second end of said second toggle means firmly against said cam surface; said spring means positioned to rapidly move said second toggle means second end in a first direction along said cam surface upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; substantially resilient U-shaped means having a central portion and first and second arms extending therefrom; said first and second arms being pivotally mounted to said pin means; said central portion urging against the adjacent edge of said contact blade and being sufficiently resilient to urge said contact in a direction to firmly maintain said cooperating contacts in the engaged position.

2. Operating means for use in a molded case circuit breaker, as set forth in claim 1, wherein said U-shaped means central portion being a helical spring; said arms extending from opposite ends of said spring and having hook shaped ends adapted to be hung from said pin means.

3. Operating means for use in a molded case circuit breaker having a first stationary contact and a pivotally mounted contact blade having a contact mounted thereon cooperating with said stationary contact wherein said operating means comprises a first toggle means having an arcuate cam surface along one edge thereof; second toggle means having a first end pivotally connected to said contact blade at a point intermediate the ends thereof; and having a second end rollingly engaging said cam surface; an operating handle having a first end pivotally mounted in said housing and a second end movable along an arcuate path between a closed and an open position; spring means having a first end connected to a second end of said second toggle means and a second end connected to the second end of said operating handle for urging the second end of said second toggle means firmly against said cam surface; said spring means positioned to rapidly move said second toggle means second end in a first direction along said cam surface upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; first and second substantially U-shaped retainer pins having their central portions abutting said pin means and their first and second arms hanging downwardly therefrom; the ends of each of said arms being hooked in the upward direction; helical spring means surrounding the arms of said first and second U-shaped retainer pins and having a first end abutting one edge of the contact blade and having the second end supported by the hooked portions of said retaining pin arms.

4. Operating means for use in a molded case circuit breaker having a first stationary contact and a pivotally mounted contact blade having a contact mounted thereon cooperating with said stationary contact wherein said operating means comprises a first toggle means having an arcuate cam surface along one edge thereof; second toggle means having a first end pivotally connected to said contact blade at a point intermediate the ends thereof; and having a second end rollingly engaging said cam surface; an operating handle having a first end pivotally mounted in said housing and a second end movable along an arcuate path between a closed and an open position; spring means having a first end connected to the second end of said second toggle means and a second end connected to the second end of said operating handle for urging the second end of said second toggle means firmly against said cam surface; said spring means positioned to rapidly move said second toggle means second end in a first direction along said cam surface upon movement of said operating handle from said closed to said open position to rapidly disengaged said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; substantially resilient U-shaped means having a central portion and first and second arms extending therefrom; said first and second arms being pivotally mounted to said pin means; helical spring means positioned to surround said arms; said central portion adapted to support said helical spring means for urging the opposite end thereof against the adjacent edge of said contact blade and being sufficiently resilient to urge said contact in a direction to firmly maintain said cooperating contacts in the engaged position.

5. Operating means for use in a molded case circuit breaker having a first stationary contact and a pivotally mounted contact blade having a contact mounted thereon cooperating with said stationary contact wherein said operating means comprises a first toggle means having an arcuate cam surface along one edge thereof; second toggle means having a first end pivotally connected to said contact blade at a point intermediate the ends thereof; and having a second end rollingly engaging said cam surface; an operating handle having a first end pivotally mounted in said housing and a second end movable along an arcuate path between a closed and an open position; spring means having a first end connected to the second end of said second toggle means and a second end connected to the second end of said operating handle for urging the second end of said second toggle means firmly against said cam surface; said spring means positioned to rapidly move said second toggle means second end in a first direction along said cam surface upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising torsion spring means having a central portion positioned around the pivotal connection between said second toggle means and said contact blade and having first and second arms being upon the pin means pivotally mounting said contact blade to said breaker housing and having third and fourth arms bearing upon the lower edge of said contact blade adjacent the pivotal mounting thereof; said first and second arms being adapted to move toward said third and fourth arms to maintain said cooperating contact firmly engaged.

6. Operating means for use in a molded case circuit breaker having a first stationary contact and a pivotally mounted contact blade having a contact mounted thereon cooperating with said stationary contact wherein said operating means comprises an overcenter toggle linkage connected to the contact blade to effect rapid movement thereof into and out of engagement with said stationary contact; said toggle linkage having a first end pivotally connected to said contact blade at a point intermediate the ends thereof, an operating handle pivotally mounted in said housing, and movable along a path between a closed and an open position; spring means having a first end connected to said toggle linkage and a second end connected to said operating handle; said spring means positioned to rapidly move said toggle linkage in a direction upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; substantially resilient U-shaped means having a central portion and first and second arms extending therefrom; said first and second arms being pivotally mounted to said pin means; said central portion urging against the adjacent edge of said contact blade and being sufficiently resilient to urge said contact in a direction to firmly maintain said cooperating contacts in the engaged position.

7. Operating means for use in a molded case circuit breaker, as set forth in claim 1, wherein said U-shaped means central portion being a helical spring; said arms extending from opposite ends of said spring and having hook shaped ends adapted to be hung from said pin means.

8. Operating means for use in a molded case circuit breaker having a first stationary contact and a pivotally mounted contact blade having a contact mounted thereon cooperating with said stationary contact wherein said operating means comprises a toggle means having a first end pivotally connected to said contact blade at a point intermediate the ends thereof; an operating handle pivotally mounted in said housing and movable along a path between a closed and an open position; spring means having a first end connected to said toggle means and a second end connected to said operating handle; said spring means positioned to rapidly move said toggle means in a direction upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; first and second substantially U-shaped retainer members having their central portions abutting said pin means and their first and second arms hanging downwardly therefrom; the ends of each of said arms being hooked in the upward direction; helical spring means surrounding the arms of said first and second U-shaped retainer members and having a first end abutting one edge of the contact blade and having the second end supported by the hooked portions of said retaining member arms.

9. Operating means for use in a molded case circuit breaker having a first stationary contact and a pivotally mounted contact blade having a contact mounted thereon cooperating with said stationary contact wherein said operating means comprises a toggle means having a first end pivotally connected to said contact blade at a point intermediate the ends thereof; an operating handle pivotally mounted in said housing and movable along a path between a closed and an open position; spring means having a first end connected to said toggle means and a second end connected to said operating handle; said spring means positioned to rapidly move said toggle means in a direction upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising pin means for pivotally mounting said contact blade to the molded case breaker housing; said contact blade having an elongated slot for receiving said pin means; substantially resilient U-shaped means having a central portion and first and second arms extending therefrom; said first and second arms being pivotally mounted to said pin means; helical spring means positioned to surround said arms; said central portion adapted to support said helical spring means for urging the opposite end thereof against the adjacent edge of said contact blade and being sufficiently resilient to urge said contact in a direction to firmly maintain said cooperating contacts in the engaged position.

10. Operating means for use in a molded case circuit breaker having a first stationary contact and a pivotally mounted contact blade having a contact mounted thereon cooperating with said stationary contact wherein said operating means comprises a toggle means pivotally connected to said contact blade at a point intermediate the ends thereof; an operating handle pivotally mounted in said housing and movable along a path between a closed and an open position; spring means having a first end connected to said toggle means and a second end connected to said operating handle; said spring means positioned to rapidly move said toggle means in a direction along said cam surface upon movement of said operating handle from said closed to said open position to rapidly disengage said cooperating contacts; said pivotal mounting for said contact blade comprising contact pressure producing means for maintaining said cooperating contacts in firm engagement when said circuit breaker is in the closed position; said contact pressure producing means comprising torsion spring means having a central portion positioned around the pivotal connection between said second toggle means and said contact blade and having first and second arms being upon the pin means pivotally mounting said contact blade to said breaker housing and having third and fourth arms bearing upon the lower edge of said contact blade adjacent the pivotal mounting thereof; said first and second arms being adapted to move toward said third and fourth arms to maintain said cooperating contact firmly engaged.

No references cited.

ROBERT K. SCHAEFER, *Primary Examiner.*

UNITED STATES PATENT OFFICE
CERTIFICATE OF CORRECTION

Patent No. 3,286,067                                          November 15, 1966

Michael A. Menickella et al.

It is hereby certified that error appears in the above numbered patent requiring correction and that the said Letters Patent should read as corrected below.

Column 10, line 51, and column 12, line 47, for "being", each occurrence, read -- bearing --.

Signed and sealed this 23rd day of July 1968.

(SEAL)
Attest:

Edward M. Fletcher, Jr.                            EDWARD J. BRENNER

Attesting Officer                                             Commissioner of Patents